UNITED STATES PATENT OFFICE 2,541,701

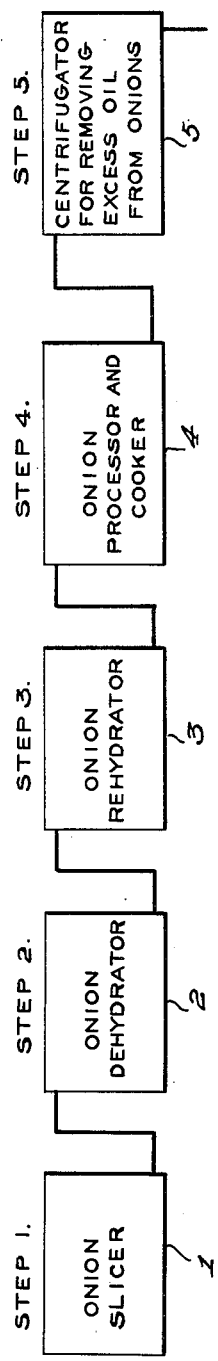

PROCESS OF TREATING ONIONS

Bernardo H. Karmen, Chatsworth, Calif.; O. T. Gilbank, trustee in bankruptcy of said Bernardo H. Karmen, assignor to Arthur Getz Application June 10, 1948, Serial No. 32,121

1 Claim. (Cl. 99—154)

This invention relates to a process of treating onions.

An object of the invention is to provide a process of treating onions so that the resulting product will remain chemically stable and free from deterioration for an indefinite period of time, for use primarily in the making of onion soup, when mixed with other ingredients including a dry concentrated powdered soup stock.

The present invention is an improvement on the process of treating onions as disclosed in my Patent No. 2,236,641, granted April 1, 1941.

While the patented process resulted in an onion product which was highly satisfactory as an ingredient for soups, later experiments have shown that the onion product could be materially improved both in color and taste by a modified process of treating the onions.

It is accordingly a further object of the invention to provide an improved process of treating onions whereby the resulting product will be superior to that disclosed in my said patent.

With these objects in view, the invention resides in the process of treating onions as set forth in the following specification, and particularly pointed out in the appended claim.

In the accompanying drawing, the figure is a diagrammatic representation of the steps in the improved process of treating onions, the successive steps 1 to 5, inclusive, represented as being carried out in an onion slicer 1, an onion dehydrator 2, an onion rehydrator 3, an onion processor and cooker 4, and a centrifuge 5.

These several treating stations are represented as being interconnected by heavy lines which may represent conduits for automatic passage of the onions from one station to another or may represent merely the transfer of the onions by any suitable manual means from one station to another. It is, however, immaterial so far as the present process is concerned, as to how or by what means the onions are passed from one station to another.

The improved process of treating the onions in accordance with the present invention comprises the following successive steps:

Step 1.—The onions are sliced.

Step 2.—The onions, after being sliced, are dehydrated.

Step 3.—The onions, after having been dehydrated, are treated with moisture, or rehydrated with approximately 5% liquid.

Step 4.—The onions are then submerged in a fat or vegetable oil at a high temperature, whereby excess moisture is driven off and the onions are fried.

Step 5.—Excess fat or oil from the onions is removed by centrifugal action, rendering the onions flaky and dry, but allowing sufficient fat to remain in the onion flakes so that they become a "fat carrier" into any soup in which they are used, while at the same time imparting a nice brown color to the prepared soup.

This process results in a product which is more uniform in color, and which has a better taste than the product resulting from the process disclosed in my patent above referred to.

While the present process may appear to be generally as disclosed in my patent, it is sufficiently different as to result in a product superior to that resulting from the patented process. In the patented process, the onions are sliced and processed with heat in the presence of fat until the onions turn brown, and then removing excess moisture and any fatty residue.

The present process is substantially the reverse, since the onions after having been sliced are dehydrated, then treated with moisture, then processed with heat in the presence of fat until the onions turn brown and allow the fat to remain in the onion, so that the onion also acts as a "carrier" of the fat into the soup when it is cooked.

The product resulting from the present improved process is packaged as in said patent, wherein a measured amount of the processed onions are packed in a suitable receptacle, and other ingredients such as dry soup stock, grated cheese, and croutons in separate packages are disposed in the receptacle with the onions.

The soup resulting from cooking the above ingredients with the onions, however, is of better flavor than that in accordance with the patent, which is due to the improved process of treating the onions, and particularly in the retention of some of the fat by the onion flakes.

What I claim and desire to secure by U. S. Letters Patent is:

A process of treating onions which comprises the following steps: slicing the onions, dehydrating the sliced onions, rehydrating the sliced onions with approximately 5% liquid, submerging the moistened sliced onions in a fat at a high temperature wherein the onions are fried and excess moisture removed, and then centrifuging the sliced onions wherein they are rendered substantially dry but with the retention of sufficient fat so that the onions become a fat carrier into any soup in which they are used.

BERNARDO H. KARMEN.

REFERENCES CITED

The following references are of record in the file of this patent:

UNITED STATES PATENTS

| Number | Name | Date |
|---|---|---|
| 2,236,641 | Karmen | Apr. 1, 1941 |